(12) United States Patent
Negley et al.

(10) Patent No.: US 8,057,070 B2
(45) Date of Patent: Nov. 15, 2011

(54) SELF-BALLASTED SOLID STATE LIGHTING DEVICES

(75) Inventors: Gerald H. Negley, Durham, NC (US); Antony Paul Van De Ven, Hong Kong (CN); Wai Kwan Chan, Hong Kong (CN); Paul Kenneth Pickard, Morrisville, NC (US); Peter Jay Myers, Raleigh, NC (US)

(73) Assignee: Cree, Inc., Durham, NC (US)

( * ) Notice: Subject to any disclaimer, the term of this patent is extended or adjusted under 35 U.S.C. 154(b) by 375 days.

(21) Appl. No.: 11/947,392

(22) Filed: Nov. 29, 2007

(65) Prior Publication Data
US 2008/0130298 A1    Jun. 5, 2008

Related U.S. Application Data

(60) Provisional application No. 60/861,824, filed on Nov. 30, 2006, provisional application No. 60/916,664, filed on May 8, 2007.

(51) Int. Cl.
*F21V 29/00* (2006.01)
(52) U.S. Cl. ......... 362/294; 362/373; 362/362; 362/364
(58) Field of Classification Search .................. 362/294, 362/373
See application file for complete search history.

(56) References Cited

U.S. PATENT DOCUMENTS

| | | | |
|---|---|---|---|
| 4,388,677 A | 6/1983 | Druffel | |
| 5,850,126 A | 12/1998 | Kanbar | |
| 5,934,788 A | 8/1999 | Wolfe | |
| D416,349 S | 11/1999 | Pahl | |
| D417,305 S | 11/1999 | Pahl | |
| D417,306 S | 11/1999 | Pahl | |
| D417,307 S | 11/1999 | Pahl | |
| D417,746 S | 12/1999 | Pahl | |
| D417,747 S | 12/1999 | Pahl | |
| 6,076,936 A | 6/2000 | George | |
| 6,082,870 A | 7/2000 | George | |
| 6,095,671 A | 8/2000 | Hutain | |

(Continued)

FOREIGN PATENT DOCUMENTS

DE    299 21 156    5/2000

(Continued)

OTHER PUBLICATIONS

Machine Translation of Erco EP 1722158.*

(Continued)

*Primary Examiner* — Evan Dzierzynski
(74) *Attorney, Agent, or Firm* — Burr & Brown (57) ABSTRACT

A lighting device, comprising a light engine housing, a light engine comprising one or more solid state light emitters, a diffuser and an energy forwarding element which receives AC voltage and supplies power to the light engine. The light engine housing comprises an electrical connection region which is engageable with an electricity supply device. The light engine housing comprises a first compartment, in which the light engine is positioned and a second compartment. The light engine housing comprises a flange region. The first compartment has an opening which is covered by the diffuser. The lighting device can be mounted such the only elements which are visible from a room are the flange region, a front side of the diffuser and any portion of the first compartment which is between the opening and the open end of the light engine housing. The light engine housing can comprise heat-dissipating fins.

27 Claims, 2 Drawing Sheets

U.S. PATENT DOCUMENTS

| | | | |
|---|---|---|---|
| 6,340,868 | B1 | 1/2002 | Lys et al. |
| 6,416,200 | B1 | 7/2002 | George |
| 6,578,986 | B2 | 6/2003 | Swaris et al. |
| 6,712,486 | B1 | 3/2004 | Popovich et al. |
| 6,846,093 | B2 | 1/2005 | Swaris et al. |
| 7,014,336 | B1 | 3/2006 | Ducharme et al. |
| 7,102,172 | B2 | 9/2006 | Lynch et al. |
| 7,108,396 | B2 | 9/2006 | Swaris et al. |
| 7,114,831 | B2 | 10/2006 | Popovich et al. |
| 7,213,940 | B1 | 5/2007 | Van De Ven et al. |
| 7,306,353 | B2 | 12/2007 | Popovich et al. |
| 7,329,024 | B2 | 2/2008 | Lynch et al. |
| 7,387,406 | B2 | 6/2008 | Swaris et al. |
| 7,521,872 | B2 * | 4/2009 | Bruning ........................ 315/158 |
| 2005/0073848 | A1 * | 4/2005 | King et al. .................... 362/296 |
| 2005/0111222 | A1 * | 5/2005 | Olsson et al. ................. 362/267 |
| 2005/0111234 | A1 | 5/2005 | Martin et al. |
| 2005/0168986 | A1 | 8/2005 | Wegner |
| 2005/0243552 | A1 * | 11/2005 | Maxik ........................... 362/249 |
| 2005/0243556 | A1 | 11/2005 | Lynch |
| 2005/0251698 | A1 | 11/2005 | Lynch et al. |
| 2006/0098440 | A1 * | 5/2006 | Allen ............................ 362/294 |
| 2006/0250801 | A1 * | 11/2006 | Trenchard et al. ............ 362/294 |
| 2006/0261359 | A1 | 11/2006 | Huang |
| 2006/0262521 | A1 | 11/2006 | Piepgras et al. |
| 2006/0267028 | A1 | 11/2006 | Lynch et al. |
| 2007/0041220 | A1 | 2/2007 | Lynch |
| 2007/0097693 | A1 | 5/2007 | Klose |
| 2007/0247414 | A1 | 10/2007 | Roberts |
| 2008/0055915 | A1 | 3/2008 | Lynch et al. |
| 2008/0062699 | A1 | 3/2008 | Popovich et al. |
| 2008/0192462 | A1 | 8/2008 | Steedly et al. |

FOREIGN PATENT DOCUMENTS

| | | |
|---|---|---|
| EP | 1 006 311 | 6/2000 |
| EP | 1 174 307 | 1/2002 |
| EP | 1 586 814 | 10/2005 |
| EP | 1 600 691 | 11/2005 |
| EP | 1 674 792 | 6/2006 |
| EP | 1 722 158 | 11/2006 |

OTHER PUBLICATIONS

U.S. Appl. No. 11/613,692, filed Dec. 20, 2006.
U.S. Appl. No. 11/614,180, filed Dec. 21, 2006.
U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/626,483, filed Jan. 24, 2007.
U.S. Appl. No. 11/743,754, filed May 3, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/755,153, filed May 30, 2007.
U.S. Appl. No. 11/755,162, filed May 30, 2007.
U.S. Appl. No. 11/856,421, filed Sep. 17, 2007.
U.S. Appl. No. 11/854,744, filed Sep. 13, 2007.
U.S. Appl. No. 11/859,048, filed Sep. 21, 2007.
U.S. Appl. No. 11/936,163, filed Nov. 7, 2007.
U.S. Appl. No. 11/843,243, filed Aug. 22, 2007.
U.S. Appl. No. 11/948,021, filed Nov. 30, 2007.
U.S. Appl. No. 11/939,052, filed Nov. 13, 2007.
U.S. Appl. No. 11/939,059, filed Nov. 13, 2007.
U.S. Appl. No. 11/877,038, filed Oct. 23, 2007.
U.S. Appl. No. 11/870,679, filed Oct. 11, 2007.
U.S. Appl. No. 11/951,626, filed Dec. 6, 2007.
U.S. Appl. No. 11/948,041, filed Nov. 30, 2007.
U.S. Appl. No. 12/035,604, filed Feb. 22, 2008.
U.S. Appl. No. 12/277,745, filed Nov. 25, 2008.
Permlight LED Fixtures (1 page) Feb. 2005.
Prescolite Architektur LED Downlights (8 pages) Sep. 2008.
PermLight LED Luminaires (3 pages) Nov. 2006.

* cited by examiner

SELF-BALLASTED SOLID STATE LIGHTING DEVICES

CROSS-REFERENCE TO RELATED APPLICATIONS

This application claims the benefit of U.S. Provisional Patent Application No. 60/861,824, filed Nov. 30, 2006, the entirety of which is incorporated herein by reference.

This application claims the benefit of U.S. Provisional Patent Application No. 60/916,664, filed May 8, 2007, the entirety of which is incorporated herein by reference.

FIELD OF THE INVENTION(S)

The present inventive subject matter relates to integrated downlighting fixtures for solid state light emitters which include a light source/engine, an energy forwarding element, and an electrical connector (e.g., for engagement with an Edison socket) in a single structure.

BACKGROUND OF THE INVENTION(S)

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient than solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, light emitting diodes, for example, have typical lifetimes between 50,000 and 70,000 hours. Fluorescent bulbs have longer lifetimes (e.g., 10,000-20,000 hours) than incandescent lights, but provide less favorable color reproduction.

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (lm/W), low cost, and/or duration of service.

In addition, there is an ongoing need to make lighting devices, including lighting device comprising conventional light emitters (e.g., incandescent light bulbs, fluorescent light bulbs, etc) and/or solid state light emitters, in which the components of the lighting devices are held together more securely, in which the lighting device dissipates heat more effectively, and/or which are more energy efficient.

BRIEF SUMMARY OF THE INVENTION(S)

While a well-designed solid state light emitter-based recessed downlight can be seen to have many advantages over traditional lighting solutions, in general, it still is only capable of addressing newly constructed buildings, where a new type of light fixture can be substituted for a traditional one during rough-in. A more comprehensive solution would involve incorporating the solid state light emitters and associated optics (replacing the traditional lamp or source), the power supply (traditionally the ballast), the room viewable structure (traditionally the trim) and mechanical attachment and connection means into a single structure downlight product that can replace any existing incandescent lamp in a traditional fixture.

Such a solution is provided by the devices according to the present inventive subject matter, whereby the user may either choose the solid state light emitter-based fixture at the time of construction or for use with an existing installation, e.g., of traditional downlight "cans." The present inventive subject matter provides a "self-ballasted" solid state light emitter lighting device. As such, a homeowner, building owner or contractor need only remove the existing lamp and trim from a traditional recessed downlight and replace them with a device according to the present inventive subject matter in order to reduce energy consumption, upgrade the fixture aesthetics, and improve light distribution. In function, the devices according to the present inventive subject matter act similarly to a self-ballasted compact fluorescent lamp, encouraging easy adoption by allowing the consumer to retain the existing traditional fixture structure and still attain the benefits of the new technology.

Some devices according to the present inventive subject matter require integration of the "trim" structure to transfer energy from the heat-sensitive solid state light emitters to the outside environment; and thereby such devices provide for mechanical retention independent of the trim, as the traditional trim (which typically holds itself and the lamp in the can) cannot be reused with the device. This can be accomplished, e.g., through the integral Edison connector to the socket, if the Edison socket is hard-mounted in the traditional can fixture, or with a completely independent mechanical structure that does not rely at all on the Edison socket for structural support (see, e.g., FIGS. 1-5).

According to a first aspect of the present inventive subject matter, there is provided a lighting device, comprising:
a light engine housing;
a light engine;
a diffuser; and
an energy forwarding element,
the light engine housing comprising an electrical connection region, the electrical connection region being engageable with an electricity supply device,
the light engine housing comprising a first compartment and a second compartment,
the light engine housing comprising a plurality of heat-dissipating fins,
the light engine housing comprising a flange region which surrounds an open end of the light engine housing,
the light engine being positioned within the first compartment of the light engine housing,
the light engine comprising at least a first solid state light emitter, the energy forwarding element being positioned within the second compartment of the light engine housing, at least a first region of the energy forwarding element being electrically connected to the electrical connection region, at least a second region of the energy forwarding element being electrically connected to the light engine, the energy forwarding element comprising circuitry which, if power of an AC voltage is supplied to the first region of the energy forwarding element, supplies energy to the light engine in a form such that the first solid state light emitter will emit light, the first compartment having an opening which is covered by the diffuser, whereby at least a portion of light emitted by the first solid state light emitter which travels toward the opening will pass through the diffuser and then through the open end of the light engine housing to exit from the light engine housing, whereby if the lighting device is mounted in a hole in a structure such that the flange region is on a first side of the structure and at least a portion of a back side of the flange region is in contact with a region of the first side of the structure which surrounds the hole, and a remainder of the light engine housing is on an opposite side of the hole relative to the flange region, the only elements which would be visible within a field defined by an outer periphery of the flange portion of the light engine housing from a vantage point which is in a region which is to the first side of the structure would be a front side of the flange region, a front side of the diffuser and any portion of the first compartment which is between the opening and the open end.

According to a second aspect of the present inventive subject matter, there is provided a lighting device, comprising:

a light engine housing;
a light engine;
a diffuser; and
an energy forwarding element, the light engine housing comprising an electrical connection region, the electrical connection region being engageable with an electricity supply device, the light engine housing comprising a first compartment and a second compartment, the light engine housing comprising a flange region which surrounds an open end of the light engine housing, the light engine being positioned within the first compartment of the light engine housing, the light engine comprising at least a first solid state light emitter, the energy forwarding element being positioned within the second compartment of the light engine housing, at least a first region of the energy forwarding element being electrically connected to the electrical connection region, at least a second region of the energy forwarding element being electrically connected to the light engine, the energy forwarding element comprising circuitry which, if power of an AC voltage is supplied to the first region of the energy forwarding element, supplies energy to the light engine in a form such that the first solid state light emitter will emit light, an entirety of the energy forwarding element being within a space whose boundaries would be defined by points through which a periphery of the open end would pass if the periphery of the open end were moved, in a direction parallel to a shortest line segment connecting the electrical connection region and the diffuser, from the open end to a position where the periphery of the open end would surround the electrical connection region, the first compartment having an opening which is covered by the diffuser, whereby at least a portion of light emitted by the first solid state light emitter which travels toward the opening will pass through the diffuser and then through the open end of the light engine housing to exit from the light engine housing, whereby if the lighting device is mounted in a hole in a structure such that the flange region is on a first side of the structure and at least a portion of a back side of the flange region is in contact with a region of the first side of the structure which surrounds the hole, and a remainder of the light engine housing is on an opposite side of the hole relative to the flange region, the only elements which would be visible within a field defined by an outer periphery of the flange portion of the light engine housing from a vantage point which is in a region which is to the first side of the structure would be a front side of the flange region, a front side of the diffuser and any portion of the first compartment which is between the opening and the open end.

According to a third aspect of the present inventive subject matter, there is provided a lighting device, comprising:

a light engine housing;
means for generating light;
a diffuser; and
means for forwarding energy, the light engine housing comprising means for receiving AC voltage, the light engine housing comprising a first compartment and a second compartment, the light engine housing comprising a plurality of heat-dissipating fins, the light engine housing comprising a flange region which surrounds an open end of the light engine housing, the means for generating light being positioned within the first compartment of the light engine housing, the means for generating light comprising at least a first solid state light emitter, the means for forwarding energy being positioned within the second compartment of the light engine housing, the means for forwarding energy being electrically connected to the means for receiving AC voltage, the means for forwarding energy being electrically connected to the means for generating light, the means for forwarding energy comprising means for converting power of an AC voltage to a form which, if supplied to the means for generating light, will cause the means for generating light to emit light, the first compartment having an opening which is covered by the diffuser, whereby at least a portion of light emitted by the first solid state light emitter which travels toward the opening will pass through the diffuser and then through the open end of the light engine housing to exit from the light engine housing, whereby if the lighting device is mounted in a hole in a structure such that the flange region is on a first side of the structure and at least a portion of a back side of the flange region is in contact with a region of the first side of the structure which surrounds the hole, and a remainder of the light engine housing is on an opposite side of the hole relative to the flange region, the only elements which would be visible within a field defined by an outer periphery of the flange portion of the light engine housing from a vantage point which is in a region which is to the first side of the structure would be a front side of the flange region, a front side of the diffuser and any portion of the first compartment which is between the opening and the open end.

In some embodiments according to the present inventive subject matter, the electrical connection region is engageable in an Edison socket.

In some embodiments according to the present inventive subject matter, the first solid state light emitter comprises an LED.

In some embodiments according to the present inventive subject matter, the lighting device further comprises a lighting device housing, the light engine housing being positioned such that an entirety of the light engine housing, except for the flange region, is within the lighting device housing. In some of such embodiments, the lighting device housing is substantially cylindrical.

In some embodiments according to the present inventive subject matter, the energy forwarding element converts the power of an AC voltage into power of a DC voltage.

In some embodiments according to the present inventive subject matter, the open end is substantially circular.

In some embodiments according to the present inventive subject matter, the AC voltage is line voltage.

The inventive subject matter may be more fully understood with reference to the accompanying drawings and the following detailed description of the inventive subject matter.

DETAILED DESCRIPTION OF THE INVENTION(S)

The present inventive subject matter now will be described more fully hereinafter with reference to the accompanying drawings, in which embodiments of the inventive subject matter are shown. However, this inventive subject matter should not be construed as limited to the embodiments set forth herein. Rather, these embodiments are provided so that this disclosure will be thorough and complete, and will fully convey the scope of the inventive subject matter to those skilled in the art. Like numbers refer to like elements throughout. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

When an element such as a layer, region or substrate is referred to herein as being "on" or extending "onto" another element, it can be directly on or extend directly onto the other element or intervening elements may also be present. In contrast, when an element is referred to herein as being "directly on" or extending "directly onto" another element, there are no intervening elements present. Also, when an element is referred to herein as being "connected" or "coupled" to another element, it can be directly connected or coupled to the other element or intervening elements may be present. In contrast, when an element is referred to herein as being "directly connected" or "directly coupled" to another element, there are no intervening elements present.

Although the terms "first", "second", etc. may be used herein to describe various elements, components, regions, layers, sections and/or parameters, these elements, components, regions, layers, sections and/or parameters should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive subject matter.

Furthermore, relative terms, such as "lower" or "bottom" and "upper" or "top," may be used herein to describe one element's relationship to another elements as illustrated in the Figures. Such relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The expression "illumination" (or "illuminated"), as used herein when referring to a solid state light emitter, means that at least some current is being supplied to the solid state light emitter to cause the solid state light emitter to emit at least some light. The expression "illuminated" encompasses situations where the solid state light emitter emits light continuously or intermittently at a rate such that a human eye would perceive it as emitting light continuously, or where a plurality of solid state light emitters of the same color or different colors are emitting light intermittently and/or alternatingly (with or without overlap in "on" times) in such a way that a human eye would perceive them as emitting light continuously (and, in cases where different colors are emitted, as a mixture of those colors).

A lumiphor emits light when it becomes excited. The expression "excited" means that at least some electromagnetic radiation (e.g., visible light, UV light or infrared light) is contacting the lumiphor, causing the lumiphor to emit at least some light. The expression "excited" encompasses situations where the lumiphor emits light continuously or intermittently at a rate such that a human eye would perceive it as emitting light continuously, or where a plurality of lumiphors of the same color or different colors are emitting light intermittently and/or alternatingly (with or without overlap in "on" times) in such a way that a human eye would perceive them as emitting light continuously (and, in cases where different colors are emitted, as a mixture of those colors).

The expression "lighting device", as used herein, is not limited, except that it indicates that the device is capable of emitting light. That is, a lighting device can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting—work lights, etc., mirrors/vanity lighting, or any other light emitting device.

A statement herein that two components in a device are "electrically connected," means that there are no components electrically between the components, the insertion of which materially affect the function or functions provided by the device. For example, two components can be referred to as being electrically connected, even though they may have a small resistor between them which does not materially affect the function or functions provided by the device (indeed, a wire connecting two components can be thought of as a small resistor); likewise, two components can be referred to as being electrically connected, even though they may have an additional electrical component between them which allows the device to perform an additional function, while not materially affecting the function or functions provided by a device which is identical except for not including the additional component; similarly, two components which are directly connected to each other, or which are directly connected to opposite ends of a wire or a trace on a circuit board or another medium, are electrically connected.

As used herein, the term "substantially," e.g., in the expressions "substantially cylindrical" or "substantially circular" means at least about 90% correspondence with the feature recited, e.g., the expression "substantially cylindrical", as used herein, means that at least 90% of the points in the surface which is characterized as being substantially cylindrical are located on one of or between a pair of imaginary cylindrical structures which are spaced from each other by a distance of not more than 10% of their largest dimension; and the expression "substantially circular" means that a circle can be drawn having the formula $x^2+y^2=1$, where imaginary axes can be drawn at a location where the y coordinate of each point on the structure is within 0.90 to 1.10 times the value obtained by inserting the x coordinate of such point into such formula.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein. It will also be appreciated by those of skill in the art that references to a structure or feature that is disposed "adjacent" another feature may have portions that overlap or underlie the adjacent feature.

As noted above, in the lighting devices of the present inventive subject matter, there is provided a light engine housing. The light engine housing can be of any desired shape, and can be made of any desired material, a wide variety of both of which are well-known to persons skilled in the art. Representative examples of a material out of which the light engine housing can be made include, among a wide variety of other materials, extruded aluminum, die cast aluminum, liquid crystal polymer, polyphenylene sulfide (PPS), thermoset bulk molded compound or other composite material, any of which would provide excellent heat transfer properties, which would assist in dissipating heat generated by the light engine. In some embodiments, the light engine housing has a plurality of fin elements which increase the surface area of the light engine housing, thereby increasing the heat dissipation characteristics of the lighting device.

In the lighting devices of the present inventive subject matter, the light engine housing houses a light engine and an energy forwarding element. The light engine comprises at least one light emitter (e.g., a solid state light emitter, such as one or more LEDs, some or all of which may or may not further include a luminescent material). Any desired light engine can be employed in such embodiments according to the present inventive subject matter, and persons of skill in the art are aware of, and have ready access to, a wide variety of such light engines. Similarly, any desired energy forwarding element can be employed in such embodiments according to the present inventive subject matter, so long as such energy forwarding element is effective to deliver energy to the light emitter(s) in such a form that the light emitter(s) will emit light, and persons of skill in the art are aware of, and have ready access to, a wide variety of such energy forwarding elements for various light emitters.

For example, housings which may be used as lighting device housings or light engine housings in practicing the present inventive subject matter, and light engines which may be used in practicing the present inventive subject matter are described in:

(1) U.S. Patent Application No. 60/752,753, filed on Dec. 21, 2005, entitled "Lighting Device" (inventors: Gerald H. Negley, Antony Paul van de Ven and Neal Hunter) and U.S. patent application Ser. No. 11/613,692 (now U.S. Patent Publication No. 2007/0139923), filed Dec. 20, 2006, the entireties of which are hereby incorporated by reference;

(2) U.S. Patent Application No. 60/798,446, filed on May 5, 2006, entitled "Lighting Device" (inventor: Antony Paul van de Ven) and U.S. patent application Ser. No. 11/743,754 (now U.S. Patent Publication No. 2007/0263393), filed May 3, 2007, the entireties of which are hereby incorporated by reference;

(3) U.S. Patent Application No. 60/845,429, filed on Sep. 18, 2006, entitled "LIGHTING DEVICES, LIGHTING ASSEMBLIES, FIXTURES AND METHODS OF USING SAME" (inventor: Antony Paul van de Ven), and U.S. patent application Ser. No. 11/856,421 (now U.S. Patent Publication No. 2008/0084700), filed Sep. 17, 2007, the entireties of which are hereby incorporated by reference;

(4) U.S. Patent Application No. 60/846,222, filed on Sep. 21, 2006, entitled "LIGHTING ASSEMBLIES, METHODS OF INSTALLING SAME, AND METHODS OF REPLACING LIGHTS" (inventors: Antony Paul van de Ven and Gerald H. Negley), and U.S. patent application Ser. No. 11/859,048 (now U.S. Patent Publication No. 2008/0084701), filed Sep. 21, 2007, the entireties of which are hereby incorporated by reference;

(5) U.S. Patent Application No. 60/809,618, filed on May 31, 2006, entitled "LIGHTING DEVICE AND METHOD OF LIGHTING" (inventors: Gerald H. Negley, Antony Paul van de Ven and Thomas G. Coleman) and U.S. patent application Ser. No. 11/755,153 (now U.S. Patent Publication No. 2007/0279903), filed May 30, 2007, the entireties of which are hereby incorporated by reference;

(6) U.S. Patent Application No. 60/858,881, filed on Nov. 14, 2006, entitled "LIGHT ENGINE ASSEMBLIES" (inventors: Paul Kenneth Pickard and Gary David Trott), the entirety of which is hereby incorporated by reference;

(7) U.S. Patent Application No. 60/859,013, filed on Nov. 14, 2006, entitled "LIGHTING ASSEMBLIES AND COMPONENTS FOR LIGHTING ASSEMBLIES" (inventors: Gary David Trott and Paul Kenneth Pickard) and U.S. patent application Ser. No. 11/939,059 (now U.S. Patent Publication No. 2008/0112170), filed Nov. 13, 2007, the entireties of which are hereby incorporated by reference;

(8) U.S. Patent Application No. 60/853,589, filed on Oct. 23, 2006, entitled "LIGHTING DEVICES AND METHODS OF INSTALLING LIGHT ENGINE HOUSINGS AND/OR TRIM ELEMENTS IN LIGHTING DEVICE HOUSINGS" (inventors: Gary David Trott and Paul Kenneth Pickard), the entirety of which is hereby incorporated by reference;

(9) U.S. Patent Application No. 60/861,901, filed on Nov. 30, 2006, entitled "LED DOWNLIGHT WITH ACCESSORY ATTACHMENT" (inventors: Gary David Trott, Paul Kenneth Pickard and Ed Adams), the entirety of which is hereby incorporated by reference; and (10) U.S. Patent Application No. 60/916,384, filed on May 7, 2007, entitled "LIGHT FIXTURES, LIGHTING DEVICES, AND COMPONENTS FOR THE SAME" (inventors: Paul Kenneth Pickard, Gary David Trott and Ed Adams), the entirety of which is hereby incorporated by reference.

As noted above, in some of the embodiments of the present inventive subject matter, there is provided a trim element. The trim element in such embodiments can be of any desired shape, and can be made of any desired material, a wide variety of both of which are well-known to persons skilled in the art. Representative examples of materials which are suitable for making accessories include, among a wide variety of other materials, spun aluminum, stamped aluminum, die cast aluminum, rolled or stamped steel, hydroformed aluminum, injection molded metal, injection molded thermoplastic, compression molded or injection molded thermoset, molded glass, liquid crystal polymer, polyphenylene sulfide (PPS), thermoset bulk molded compound or other composite material.

Some devices according to the present inventive subject matter include fins (to provide heat dissipation surface area) on both the non-room side (e.g., attic side) and the room side of the housing.

Some devices according to the present inventive subject matter use LED PCB material itself as a flame barrier, allowing the diffuser to be manufactured from a material optimized for its optical characteristics without concern for UL listing or flame characteristics.

The devices of the present inventive subject matter can be used in a wide variety of fixtures, e.g., in recessed can lighting fixtures for commercial or residential application.

Recessed downlights are generally available in multiple lamp configurations and types: Incandescent-based fixtures, which use an Edison type socket (A, BR, and PAR type lamps), fluorescent fixtures using Compact Florescent lamps, and even HID lamps using miniature metal halide lamps. Incandescent fixtures run their lamps directly off line (e.g., roughly 120 VAC) voltage, whereas florescent and HID fixtures require an external ballast to convert line voltage and strike/drive the lamps. The most common fixtures historically and currently sold in the marketplace are incandescent fixtures.

Recessed downlights can use solid state light sources (e.g., light emitting diodes ("LEDs")) advantageously, if properly designed and implemented. Well-designed recessed downlights based on LED technology can provide similar light output to 65 W incandescent fixtures, with high color rendering and high efficacy. Compared to fluorescent-based fixtures, an LED fixture provides "instant on" capability, significantly improved color rendering, better light distribution, an order of magnitude longer life, similar initial cost, and improved fixture appearance.

In some embodiments of the present inventive subject matter, the light engine housing comprises an electrical connection region which is engageable in an electrical receptacle. Any desired electrical connection regions and electrical receptacles can be employed in accordance with the present inventive subject matter, and persons of skill in the art are aware of, and have ready access to, a wide variety of such electrical connection regions and electrical receptacles. For example, the electrical receptacle can be a standard Edison socket, and the electrical connection region can be a screw-threaded portion which can be screwed into an Edison socket. Alternatively, the electrical connection region can be a standard plug and the electrical receptacle can be a standard outlet, or the electrical connection region can be a GU24 base unit, or the electrical connection region can be a clip and the electrical receptacle can be a receptacle which receives and retains the clip (e.g., as used in many fluorescent lights). The options for such connection regions and receptacles are not constrained in any way, apart from the need to safely deliver electricity from the receptacle to the connection region.

A number of additional structures can also be included in the lighting devices according to the present inventive subject matter. For example, the lighting devices according to the present inventive subject matter can further include a diffuser. Any desired diffuser can be employed, and persons skilled in the art are familiar with and have easy access to a variety of such diffusers. In some embodiments of the present inventive subject matter, a diffuser is mounted to the lighting device housing below the light engine housing, whereby light emitted from the light engine passes through the diffuser and is diffused prior to exiting the lighting device into the region that will be illuminated by the lighting device, e.g., into a room. Alternatively or additionally, the lighting devices according to the present inventive subject matter can include a reflective element. Any desired reflective element can be employed, and persons skilled in the art are familiar with and have easy access to a variety of such reflective elements. A representative example of a suitable material out of which the reflective element can be made is a material marketed by Furukawa (a Japanese corporation) under the trademark MCPET®. In some embodiments of the present inventive subject matter, a reflective element is shaped and is positioned so as to cover at least part of the internal surface of the sidewall of the lighting device housing.

In some embodiments of the present inventive subject matter, a diffuser is mounted to the lighting device housing below the light engine housing, and a reflective element is mounted so as to cover the internal surface of the sidewall of the lighting device housing below the diffuser.

As noted above, in some of the embodiments of the present inventive subject matter, there is provided a lighting device housing. The lighting device housing in such embodiments can be of any desired shape, and can be made of any desired material, a wide variety of both of which are well-known to persons skilled in the art. Representative examples of materials which are suitable for making a lighting device housing include, among a wide variety of other materials, extruded aluminum, die cast aluminum, liquid crystal polymer, polyphenylene sulfide (PPS), thermoset bulk molded compound or other composite material.

As noted above, embodiments of the present inventive subject matter comprise one or more solid state light emitters. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made).

Where more than one solid state light emitters are provided, the respective light emitters can be similar to one another, different from one another or any combination (i.e., there can be a plurality of solid state light emitters of one type, or one or more solid state light emitters of each of two or more types).

As indicated above, the lighting devices according to the present inventive subject matter which include one or more solid state light emitters can comprise any desired number of solid state light emitters. For example, a lighting device according to the present inventive subject matter can include one or more light emitting diodes, 50 or more light emitting diodes, or 100 or more light emitting diodes, etc.

As noted above, in some embodiments according to the present inventive subject matter, one or more luminescent material can be employed. The expression "lumiphor", as used herein, refers to any luminescent element, i.e., any element which includes a luminescent material.

One or more lumiphors, when provided, can individually be any lumiphor, a wide variety of which are known to those skilled in the art. For example, the one or more luminescent materials in the lumiphor can be selected from among phosphors, scintillators, day glow tapes, inks which glow in the visible spectrum upon illumination with ultraviolet light, etc. The one or more luminescent materials can be down-converting or up-converting, or can include a combination of both types. For example, the first lumiphor can comprise one or more down-converting luminescent materials.

The (or each) lumiphor can, if desired, further comprise (or consist essentially of, or consist of) one or more highly transmissive (e.g., transparent or substantially transparent, or somewhat diffuse) binder, e.g., made of epoxy, silicone, glass, metal oxide or any other suitable material (for example, in any given lumiphor comprising one or more binder, one or more phosphor can be dispersed within the one or more binder). In general, the thicker the lumiphor, the lower the weight percentage of the phosphor can be.

Devices in which a lumiphor is provided can, if desired, further comprise one or more clear encapsulant (comprising, e.g., one or more silicone materials) positioned between the solid state light emitter (e.g., light emitting diode) and the lumiphor.

The (or each) lumiphor can, independently, further comprise any of a number of well-known additives, e.g., diffusers, scatterers, tints, etc.

Representative examples of LEDs and lumiphors which are suitable for use in the present inventive subject matter are described in:

(1) U.S. Patent Application No. 60/753,138, filed on Dec. 22, 2005, entitled "Lighting Device" (inventor: Gerald H. Negley) and U.S. patent application Ser. No. 11/614,180 (now U.S. Patent Publication No. 2007/0236911), filed Dec. 21, 2006, the entireties of which are hereby incorporated by reference;

(2) U.S. Patent Application No. 60/794,379, filed on Apr. 24, 2006, entitled "Shifting Spectral Content in LEDs by Spatially Separating Lumiphor Films" (inventors: Gerald H. Negley and Antony Paul van de Ven) and U.S. patent application Ser. No. 11/624,811 (now U.S. Patent Publication No. 2007/0170447), filed Jan. 19, 2007, the entireties of which are hereby incorporated by reference;

(3) U.S. Patent Application No. 60/808,702, filed on May 26, 2006, entitled "Lighting Device" (inventors: Gerald H. Negley and Antony Paul van de Ven) and U.S. patent application Ser. No. 11/751,982 (now U.S. Patent Publication No. 2007/0274080), filed May 22, 2007, the entireties of which are hereby incorporated by reference;

(4) U.S. Patent Application No. 60/808,925, filed on May 26, 2006, entitled "Solid State Light Emitting Device and Method of Making Same" (inventors: Gerald H. Negley and Neal Hunter) and U.S. patent application Ser. No. 11/753,103 (now U.S. Patent Publication No. 2007/0280624), filed May 24, 2007, the entireties of which are hereby incorporated by reference;

(5) U.S. Patent Application No. 60/802,697, filed on May 23, 2006, entitled "Lighting Device and Method of Making" (inventor: Gerald H. Negley) and U.S. patent application Ser. No. 11/751,990 (now U.S. Patent Publication No. 2007/0274063), filed May 22, 2007, the entireties of which are hereby incorporated by reference;

(6) U.S. Patent Application No. 60/839,453, filed on Aug. 23, 2006, entitled "LIGHTING DEVICE AND LIGHTING METHOD" (inventors: Antony Paul van de Ven and Gerald H. Negley) and U.S. patent application Ser. No. 11/843,243 (now U.S. Patent Publication No. 2008/0084685), filed Aug. 22, 2007, the entireties of which are hereby incorporated by reference;

(7) U.S. Patent Application No. 60/857,305, filed on Nov. 7, 2006, entitled "LIGHTING DEVICE AND LIGHTING METHOD" (inventors: Antony Paul van de Ven and Gerald H. Negley; the entirety of which is hereby incorporated by reference;

(8) U.S. Patent Application No. 60/851,230, filed on Oct. 12, 2006, entitled "LIGHTING DEVICE AND METHOD OF MAKING SAME" (inventor: Gerald H. Negley; the entirety of which is hereby incorporated by reference; and (9) U.S. Patent Application No. 60/793,524, filed on Apr. 20, 2006, entitled "LIGHTING DEVICE AND LIGHTING METHOD" (inventors: Gerald H. Negley and Antony Paul van de Ven) and U.S. patent application Ser. No. 11/736,761 (now U.S. Patent Publication No. 2007/0278934), filed Apr. 18, 2007, the entireties of which are hereby incorporated by reference.

In general, light of any number of colors can be mixed by the lighting devices according to the present inventive subject matter. Representative examples of blends of light colors are described in:

(1) U.S. Patent Application No. 60/752,555, filed Dec. 21, 2005, entitled "Lighting Device and Lighting Method" (inventors: Antony Paul Van de Ven and Gerald H. Negley) and U.S. patent application Ser. No. 11/613,714 (now U.S. Patent Publication No. 2007/0139920), filed Dec. 20, 2006, the entireties of which are hereby incorporated by reference;

(2) U.S. Patent Application No. 60/752,556, filed on Dec. 21, 2005, entitled "SIGN AND METHOD FOR LIGHTING" (inventors: Gerald H. Negley and Antony Paul van de Ven) and U.S. patent application Ser. No. 11/613,733 (now U.S.

Patent Publication No. 2007/0137074), filed Dec. 20, 2006, the entireties of which are hereby incorporated by reference;

(3) U.S. Patent Application No. 60/793,524, filed on Apr. 20, 2006, entitled "LIGHTING DEVICE AND LIGHTING METHOD" (inventors: Gerald H. Negley and Antony Paul van de Ven) and U.S. patent application Ser. No. 11/736,761 (now U.S. Patent Publication No. 2007/0278934), filed Apr. 18, 2007, the entireties of which are hereby incorporated by reference;

(4) U.S. Patent Application No. 60/793,518, filed on Apr. 20, 2006, entitled "LIGHTING DEVICE AND LIGHTING METHOD" (inventors: Gerald H. Negley and Antony Paul van de Ven) and U.S. patent application Ser. No. 11/736,799 (now U.S. Patent Publication No. 2007/0267983), filed Apr. 18, 2007, the entireties of which are hereby incorporated by reference;

(5) U.S. Patent Application No. 60/793,530, filed on Apr. 20, 2006, entitled "LIGHTING DEVICE AND LIGHTING METHOD" (inventors: Gerald H. Negley and Antony Paul van de Ven) and U.S. patent application Ser. No. 11/737,321 (now U.S. Patent Publication No. 2007/0278503), filed Apr. 19, 2007, the entireties of which are hereby incorporated by reference;

(6) U.S. Pat. No. 7,213,940, issued on May 8, 2007, entitled "LIGHTING DEVICE AND LIGHTING METHOD" (inventors: Antony Paul van de Ven and Gerald H. Negley), the entirety of which is hereby incorporated by reference;

(7) U.S. Patent Application No. 60/868,134, filed on Dec. 1, 2006, entitled "LIGHTING DEVICE AND LIGHTING METHOD" (inventors: Antony Paul van de Ven and Gerald H. Negley), the entirety of which is hereby incorporated by reference;

(8) U.S. Patent Application No. 60/868,986, filed on Dec. 7, 2006, entitled "LIGHTING DEVICE AND LIGHTING METHOD" (inventors: Antony Paul van de Ven and Gerald H. Negley), the entirety of which is hereby incorporated by reference;

(9) U.S. Patent Application No. 60/857,305, filed on Nov. 7, 2006, entitled "LIGHTING DEVICE AND LIGHTING METHOD" (inventors: Antony Paul van de Ven and Gerald H. Negley; the entirety of which is hereby incorporated by reference; and (10) U.S. Patent Application No. 60/891,148, filed on Feb. 22, 2007, entitled "LIGHTING DEVICE AND METHODS OF LIGHTING, LIGHT FILTERS AND METHODS OF FILTERING LIGHT" (inventor: Antony Paul van de Ven; the entirety of which is hereby incorporated by reference.

One or more brightness enhancement films can optionally further be included in the lighting devices according to this aspect of the present inventive subject matter. Such films are well-known in the art and are readily available. Brightness enhancement films (e.g., BEF films commercially available from 3M) are optional—when employed, they provide a more directional light source by limiting the acceptance angle. Light not "accepted" is recycled by the highly reflective light source enclosure. Preferably, the brightness enhancement films (which can optionally be replaced by one or more extraction films, such as by WFT), if employed, are optimized to limit the viewing angle of the emitted source and to increase the probability of extracting light on the first (or earliest possible) pass.

The lighting devices of the present inventive subject matter can be supplied with electricity in any desired manner. Skilled artisans are familiar with a wide variety of power supplying apparatuses, and any such apparatuses can be employed in connection with the present inventive subject matter. The lighting devices of the present inventive subject matter can be electrically connected (or selectively connected) to any desired power source, persons of skill in the art being familiar with a variety of such power sources.

Representative examples of apparatuses for supplying electricity to lighting devices and power supplies for lighting devices, as well as other circuitry which may be used in practicing the present inventive subject matter is described in:

(1) U.S. Patent Application No. 60/752,753, filed on Dec. 21, 2005, entitled "Lighting Device" (inventors: Gerald H. Negley, Antony Paul van de Ven and Neal Hunter) and U.S. patent application Ser. No. 11/613,692 (now U.S. Patent Publication No. 2007/0139923), filed Dec. 20, 2006, the entireties of which are hereby incorporated by reference;

(2) U.S. Patent Application No. 60/798,446, filed on May 5, 2006, entitled "Lighting Device" (inventor: Antony Paul van de Ven) and U.S. patent application Ser. No. 11/743,754 (now U.S. Patent Publication No. 2007/0263393), filed May 3, 2007, the entireties of which are hereby incorporated by reference;

(3) U.S. Patent Application No. 60/809,959, filed on Jun. 1, 2006, entitled "Lighting Device With Cooling" (inventors: Thomas G. Coleman, Gerald H. Negley and Antony Paul van de Ven) and U.S. patent application Ser. No. 11/626,483 (now U.S. Patent Publication No. 2007/0171145), filed Jan. 24, 2007, the entireties of which are hereby incorporated by reference;

(4) U.S. Patent Application No. 60/809,595, filed on May 31, 2006, entitled "LIGHTING DEVICE AND METHOD OF LIGHTING" (inventor: Gerald H. Negley) and U.S. patent application Ser. No. 11/755,162 (now U.S. Patent Publication No. 2007/0279440), filed May 30, 2007, the entireties of which are hereby incorporated by reference; and (5) U.S. Patent Application No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers), and U.S. patent application Ser. No. 11/854,744 (now U.S. Patent Publication No. 2008/0088248), filed Sep. 13, 2007, the entireties of which are hereby incorporated by reference.

The present inventive subject matter further relates to an illuminated enclosure (the volume of which can be illuminated uniformly or non-uniformly), comprising an enclosed space and at least one lighting device according to the present inventive subject matter, wherein the lighting device illuminates at least a portion of the enclosure (uniformly or non-uniformly).

The present inventive subject matter is further directed to an illuminated surface, comprising a surface and at least one lighting device as described herein, wherein if the lighting device is illuminated, the lighting device would illuminate at least a portion of the surface.

The present inventive subject matter is further directed to an illuminated area, comprising at least one item, e.g., selected from among the group consisting of a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, etc., having mounted therein or thereon at least one lighting device as described herein.

Embodiments in accordance with the present inventive subject matter are described herein with reference to cross-sectional (and/or plan view) illustrations that are schematic illustrations of idealized embodiments of the present inventive subject matter. As such, variations from the shapes of the illustrations as a result, for example, of manufacturing techniques and/or tolerances, are to be expected. Thus, embodiments of the present inventive subject matter should not be construed as limited to the particular shapes of regions illustrated herein but are to include deviations in shapes that result, for example, from manufacturing. For example, a molded region illustrated or described as a rectangle will, typically, have rounded or curved features. Thus, the regions illustrated in the figures are schematic in nature and their shapes are not intended to illustrate the precise shape of a region of a device and are not intended to limit the scope of the present inventive subject matter.

Figure 1:
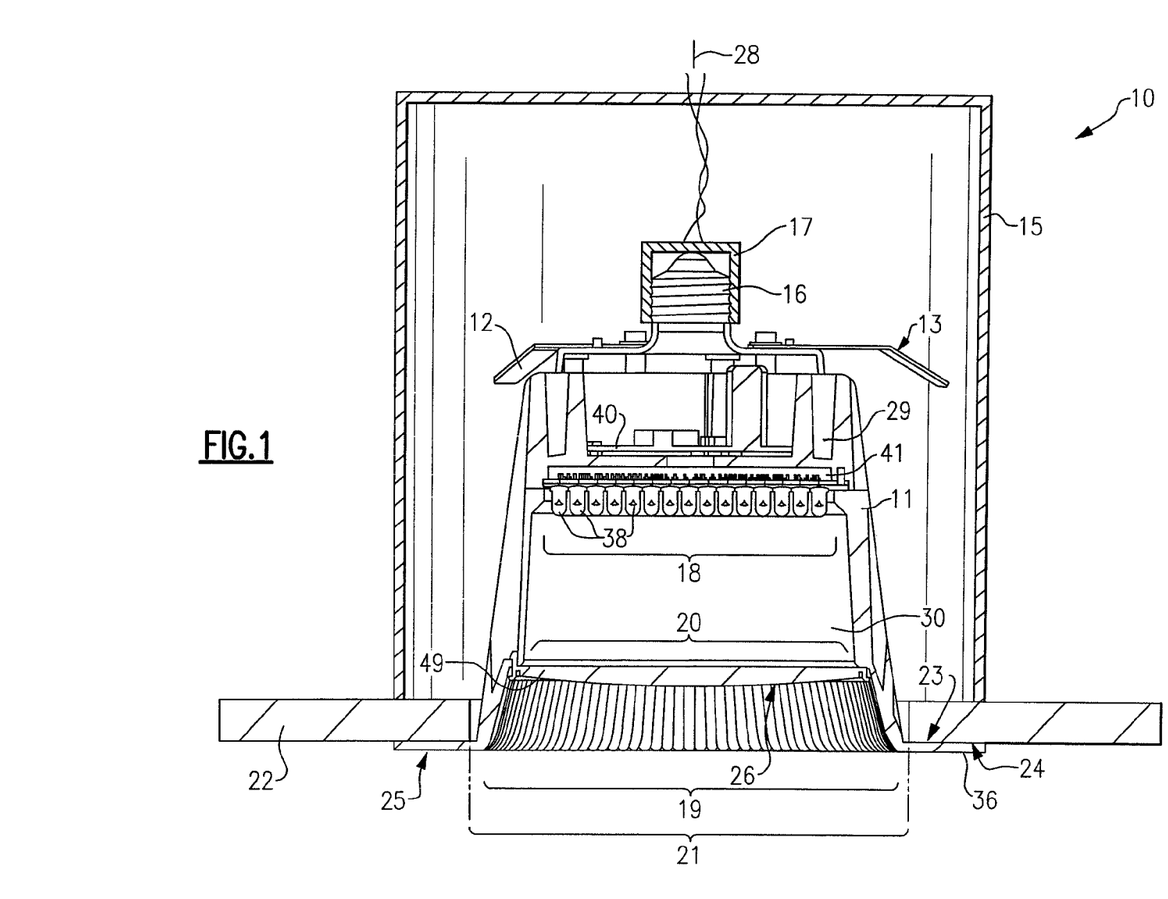
FIG. 1 is a sectional view of a first embodiment of a lighting device in accordance with the present inventive subject matter.
Figure 2:
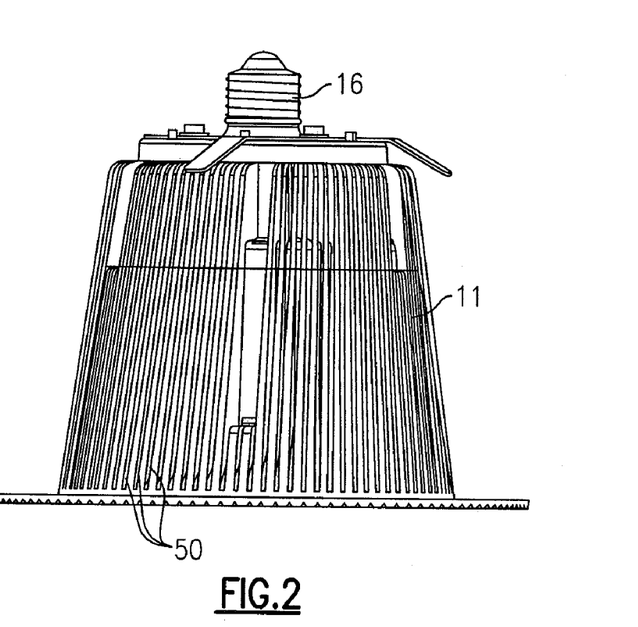
FIG. 2 is a front view of the lighting device depicted in FIG. 1, with the lighting device housing removed.
Figure 3:
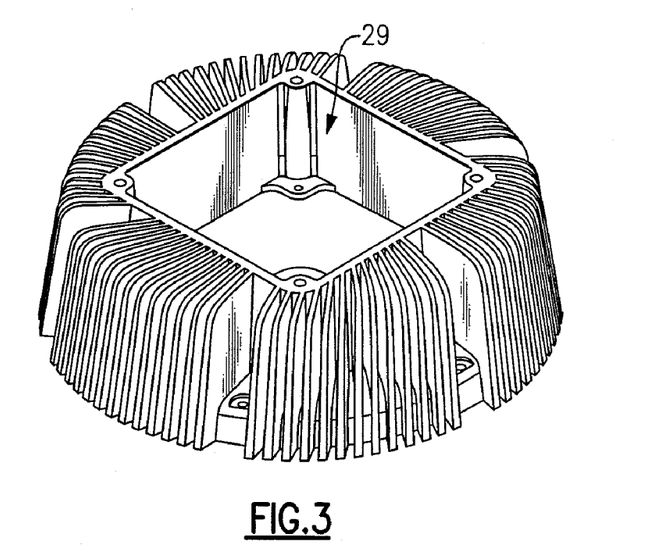
FIG. 3 is a perspective view depicting a portion of the light engine housing of the embodiment depicted in FIGS. 1-2.

FIGS. 1-3 depict a first embodiment of a lighting device in accordance with the present inventive subject matter. Referring to FIG. 1, there is shown a lighting device 10 which comprises a light engine housing 11, a first mounting clip 12, a second mounting clip 13, a third mounting clip 14 (not visible in FIG. 1), a lighting device housing 15 (which, in this embodiment, is substantially cylindrical, but could be any desired shape), a light engine 18 which comprises a plurality of solid state light emitters 38 (in this embodiment, the solid state light emitters are LEDs), a diffuser 49, and an energy forwarding element 40.

The light engine housing 11 comprises an electrical connection region 16 which is engageable with an electricity supply device 17 (in this embodiment, an Edison socket).

The light engine housing 11 comprises a first compartment 30 and a second compartment 29.

The light engine housing 11 comprises a plurality of heat-dissipating fins 50 (see FIG. 2).

The light engine housing 11 comprises a flange region 36 which surrounds an open end 19 of the light engine housing. In this embodiment, the open end 19 is substantially circular, but it could be any desired shape.

The light engine 18 is positioned within the first compartment 30 of the light engine housing 11.

The energy forwarding element 40 is positioned within the second compartment 29 of the light engine housing 11. A first region of the energy forwarding element 40 is electrically connected to the electrical connection region 16, and a second region of the energy forwarding element 40 is electrically connected to the light engine 18. If power of an AC voltage is supplied to the first region of the energy forwarding element 40, it supplies energy to the 18 light engine in a form such that the solid state light emitters 38 will emit light.

The entire energy forwarding element 40 is within a space whose boundaries would be defined by points through which a periphery of the open end 19 would pass if the periphery of the open end 19 were moved, in a direction parallel to a shortest line segment connecting the electrical connection region 16 and the diffuser 49, from the open end 19 to a position where the periphery of the open end 19 would surround the electrical connection region 16.

The first compartment 30 has an opening 20 which is covered by the diffuser 49, whereby at least a portion of light emitted by the solid state light emitters 38 which travels toward the opening 20 will pass through the diffuser 49 and then through the open end 19 of the light engine housing 11 to exit from the light engine housing 11.

The lighting device 10 is mounted in a hole 21 in a structure 22 (in this embodiment, a ceiling) such that the flange region 36 is on a first side 24 of the structure 22 and at least a portion of a back side 23 of the flange region 36 is in contact with a region of the first side 24 of the structure which surrounds the hole 21, and a remainder of the light engine housing 11 is on an opposite side of the hole 21 relative to the flange region 36, the only elements which would be visible within a field defined by an outer periphery of the flange portion 36 of the light engine housing 11 from a vantage point which is in a region which is to the first side of the structure 24 would be a front side 25 of the flange region 36, a front side 26 of the diffuser 49 and any portion of the first compartment 30 which is between the opening 20 and the open end 19. In the embodiment shown in FIGS. 1-3, the diffuser is mounted above the open end of the light engine housing, so there is a portion of the first compartment 30 which is between the opening 20 and the open end 19. In some embodiments according to the present inventive subject matter, the diffuser is mounted at the open end of the light engine housing—in such embodiments, there is no portion of the first compartment 30 which is between the opening 20 and the open end 19.

The entirety of the light engine housing 11, except for the flange region 36, is within the lighting device housing 15.

FIG. 3 is a perspective view of an upper portion of the light engine housing (which can be attached with screws to a lower portion of the light engine housing 11, and to which a cover element can be attached with screws to form the light engine housing 11) showing the second compartment 29.

FIG. 1 shows the first embodiment in cross-section. The sidewalls of the cavity between the solid state light emitters 38 and the diffuser 49 are either coated with a high reflectivity paint or powder coat, or are covered with a high reflectivity film or material which could be diffuse or specular. The diffuser acts to mix the various colors of LEDs (where different color are employed) into a uniform color from all viewing angles, and/or to provide obscuration of the individual points of light generated by the plurality of LEDs. AC power enters the device through the Edison socket (or another appropriate ⅔ pin connector, or wiring harness in this same location). The AC power is converted to DC by the power supply PCB located in the first compartment 30. The top plate (where the retention clips are mounted), the upper housing, and the Power Supply PCB for an enclosure for the AC line voltage minimize or eliminate shock and fire hazards.

The DC voltage is then passed to the LED PCB via pins or wires, through an opening in the bottom of the second compartment 29. In the instance that this DC voltage exceeds "Class 2", or is greater than 60V, a separate shock and flame barrier is required for the DC voltage as well. This can be provided by the LED PCB itself, if the traces carrying the "Class 1" voltage are only present on the upper housing side of the PCB, and the PCB itself is flame rated (like FR4.) In the instance that high voltage carrying traces are present on both sides of the board, a separate flame barrier can be provided between the LEDs and the LED PCB. This could be a laminated blank PCB substrate (like FR4) to insulate the traces, or it could be a flame rated insulating film like Formex®. On top of this flame and shock insulator (and still underneath the LEDs), there can be provided a highly reflective film, coating or material. This material insures that any light escaping the LED packages from the rear is not wasted but is reflected back into the optical cavity between the LEDs and diffuser. The device can, if desired, further include a conformal coating layer, which can be positioned in any suitable location, e.g., underneath the Formex® (if provided) and/or underneath the MCPET® (if provided).

In this embodiment, the diffuser is designed in such a manner to promote effective color mixing, depixelization, and high optical efficiency, and the diffuser can be attached via mechanical snap-fit to the lower housing in such a manner that it requires the device to be uninstalled (powered down) to remove it, and/or the diffuser (lens) can be permanently attached (i.e., removal would require breakage), e.g., by heat staking, suitable heat staking techniques being well-known in the art.

The viewable surface of the lower housing is designed in such a manner as to provide maximum surface area to the ambient environment while maintaining an acceptable aesthetic and high optical efficiency. The non-viewable surfaces of the both the lower housing and upper housing are designed to maximize surface area for heat transfer while maintaining manufacturability.

Any two or more structural parts of the lighting devices described herein can be integrated. Any structural part of the lighting devices described herein can be provided in two or more parts (which are held together, if necessary or desired). Similarly, any two or more functions can be conducted simultaneously, and/or any function can be conducted in a series of steps.

Furthermore, while certain embodiments of the present inventive subject matter have been illustrated with reference to specific combinations of elements, various other combinations may also be provided without departing from the teachings of the present inventive subject matter. Thus, the present inventive subject matter should not be construed as being limited to the particular exemplary embodiments described herein and illustrated in the Figures, but may also encompass combinations of elements of the various illustrated embodiments.

Many alterations and modifications may be made by those having ordinary skill in the art, given the benefit of the present disclosure, without departing from the spirit and scope of the inventive subject matter. Therefore, it must be understood that the illustrated embodiments have been set forth only for the purposes of example, and that it should not be taken as limiting the inventive subject matter as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the inventive subject matter.

The invention claimed is:

1. A lighting device, comprising:
a light engine housing;
means for generating light;
a diffuser; and
means for forwarding energy,
said light engine housing comprising means for receiving AC voltage,
said light engine housing comprising a first compartment and a second compartment,
said light engine housing comprising a flange region which surrounds an open end of the light engine housing,
said means for generating light within said first compartment of said light engine housing,
said means for generating light comprising at least a first solid state light emitter,
said means for forwarding energy within said second compartment of said light engine housing, said means for forwarding energy electrically connected to said means for receiving AC voltage, said means for forwarding energy electrically connected to said means for generating light, said means for forwarding energy comprising means for converting power of an AC voltage to DC current which, if supplied to said means for generating light, will cause said means for generating light to emit light,
said first compartment having an opening which is covered by said diffuser, whereby at least a portion of light emitted by said first solid state light emitter which travels toward said opening will pass through said diffuser and then through said open end of said light engine housing to exit from said light engine housing,
whereby if said lighting device is mounted in a hole in a structure such that at least a portion of a back side of said flange region is in contact with a region of said first side of said structure which surrounds said hole, and a remainder of said light engine housing is on an opposite side of said hole relative to said flange region, the only elements which would be visible within a field defined by an outer periphery of said flange region of said light engine housing from a vantage point which is in a region which is to said first side of said structure would be a front side of said flange region, a front side of said diffuser and any portion of said first compartment which is between said opening and said open end.

2. A lighting device as recited in claim 1, wherein said means for receiving AC voltage is engageable in an Edison socket or comprises a GU24 base.

3. A lighting device as recited in claim 1, wherein said first solid state light emitter comprises an LED.

4. A lighting device as recited in claim 1, wherein said lighting device further comprises a lighting device housing, said light engine housing positioned such that an entirety of said light engine housing, except for said flange region, is within said lighting device housing.

5. A lighting device as recited in claim 4, wherein said lighting device housing is substantially cylindrical.

6. A lighting device as recited in claim 1, wherein said open end is substantially circular.

7. A lighting device as recited in claim 1, wherein said AC voltage is line voltage.

8. A lighting device, comprising:
a light engine housing;
a light engine;
an energy forwarding element; and
at least a first mounting clip,
the energy forwarding element within the light engine housing,
the light engine housing comprising an electrical connection region, the electrical connection region engageable with an electricity supply device,
the light engine comprising at least a first solid state light emitter,
at least a first region of the energy forwarding element electrically connected to the electrical connection region, at least a second region of the energy forwarding element electrically connected to the light engine, the energy forwarding element comprising circuitry which, if power of an AC voltage is supplied to the first region of the energy forwarding element, supplies DC current to the light engine in a form such that the first solid state light emitter will emit light,
the first mounting clip movable between at least a first position and a second position,
wherein:
if the first mounting clip is in the first position, all points on the first mounting clip are spaced from a line extending through the lighting device by distances that are smaller than a distance that a point on the light engine housing, that is farthest from the line, is spaced from the line, and if the first mounting clip is in the second position, at least some points on the first mounting clip are spaced from the line by distances that are larger than the distance that the point on the light engine housing that is farthest from the line is spaced from the line.

9. A lighting device as recited in claim 8, wherein said light engine housing comprises a flange region which surrounds an open end of the light engine housing.

10. A lighting device as recited in claim 9, wherein:
said lighting device further comprises a diffuser, and
said first compartment has an opening which is covered by said diffuser, whereby at least a portion of light emitted by said first solid state light emitter which travels toward said opening will pass through said diffuser and then through said open end of said light engine housing to exit from said light engine housing.

11. A lighting device as recited in claim 10, wherein if said lighting device is mounted in a hole in a structure such that said flange region is on a first side of said structure and at least a portion of a back side of said flange region is in contact with a region of said first side of said structure which surrounds said hole, and a remainder of said light engine housing is on an opposite side of said hole relative to said flange region, the only elements which would be visible within a field defined by an outer periphery of said flange portion of said light engine housing from a vantage point which is in a region which is to said first side of said structure would be a front side of said flange region, a front side of said diffuser and any portion of said first compartment which is between said opening and said open end.

12. A lighting device as recited in claim 9, wherein said lighting device further comprises a lighting device housing, said light engine housing positioned such that an entirety of said light engine housing, except for said flange region, is within said lighting device housing.

13. A lighting device as recited in claim 12, wherein said lighting device housing is substantially cylindrical.

14. A lighting device as recited in claim 8, wherein said electrical connection region is engageable in an Edison socket or comprises a GU24 base.

15. A lighting device as recited in claim 8, wherein said first solid state light emitter comprises an LED.

16. A lighting device as recited in claim 8, wherein said light engine housing comprises an open end which is substantially circular.

17. A lighting device as recited in claim 8, wherein said AC voltage is line voltage.

18. A lighting device, comprising:
a light engine housing;
a light engine;
an energy forwarding element; and
at least a first mounting clip,
the energy forwarding element within the light engine housing,
the light engine housing comprising an electrical connection region, the electrical connection region engageable with an electricity supply device,
the light engine comprising at least a first solid state light emitter,
the light engine housing comprising an open end which defines a first plane,
at least a first region of the energy forwarding element electrically connected to the electrical connection region, at least a second region of the energy forwarding element electrically connected to the light engine, the energy forwarding element comprising circuitry which, if power of an AC voltage is supplied to the first region of the energy forwarding element, supplies DC current to the light engine in a form such that the first solid state light emitter will emit light,
the first mounting clip movable between at least a first position and a second position,
wherein:
if the first mounting clip is in the first position, all points on the first mounting clip are spaced from a line that is perpendicular to the first plane by distances that are smaller than a distance that a point on the light engine housing, that is farthest from the line, is spaced from the line, and
if the first mounting clip is in the second position, at least some points on the first mounting clip are spaced from the line by distances that are larger than the distance that the point on the light engine housing that is farthest from the line is spaced from the line.

19. A lighting device as recited in claim 18, wherein said first solid state light emitter comprises an LED.

20. A lighting device as recited in claim 18, wherein:
said light engine housing comprises a flange region that surrounds said open end, and
said lighting device further comprises a lighting device housing, said light engine housing positioned such that an entirety of said light engine housing, except for said flange region, is within said lighting device housing.

21. A lighting device as recited in claim 20, wherein said lighting device housing is substantially cylindrical.

22. A lighting device as recited in claim 18, wherein said open end is substantially circular.

23. A lighting device as recited in claim 18, wherein said electrical connection region is engageable in an Edison socket or comprises a GU24 base.

24. A lighting device as recited in claim 18, wherein said AC voltage is line voltage.

25. A lighting device, comprising:
a light engine housing;
a light engine; and
an energy forwarding element,
the energy forwarding element within the light engine housing,
the light engine housing comprising an electrical connection region, the electrical connection region engageable with an electricity supply device,
the light engine comprising at least a first solid state light emitter,
at least a first region of the energy forwarding element electrically connected to the electrical connection region, at least a second region of the energy forwarding element electrically connected to the light engine, the energy forwarding element comprising circuitry which, if power of an AC voltage is supplied to the first region of the energy forwarding element, supplies DC current to the light engine in a form such that the first solid state light emitter will emit light,
the light engine housing comprising an open end and a flange region, the flange region surrounding the open end,
a surface of the flange region defining a first plane,
at least some points on the flange region spaced from a line that is perpendicular to the first plane by distances that are larger than a distance that any other point on any portion of the light engine housing, except for the flange region, that is farthest from the line is spaced from the line.

26. A lighting device as recited in claim 25, wherein the lighting device further comprises a lighting device housing, the light engine housing positioned such that an entirety of the light engine housing, except for the flange region, is within the lighting device housing.

27. A lighting device as recited in claim 25, wherein:
the lighting device further comprises at least a first mounting clip,
the first mounting clip is movable between at least a first position and a second position,
if the first mounting clip is in the first position, all points on the first mounting clip are spaced from a line that is perpendicular to the first plane by distances that are smaller than a distance that a point on the light engine housing, that is farthest from the line, is spaced from the line, and
if the first mounting clip is in the second position, at least some points on the first mounting clip are spaced from the line by distances that are larger than the distance that the point on the light engine housing that is farthest from the line is spaced from the line.

* * * * *